(12) United States Patent
Kimura (10) Patent No.: US 9,035,620 B2
(45) Date of Patent: May 19, 2015

(54) BATTERY PROTECTING CIRCUIT, BATTERY PROTECTING DEVICE, AND BATTERY PACK

(71) Applicant: Daisuke Kimura, Tokyo (JP)

(72) Inventor: Daisuke Kimura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 286 days.

(21) Appl. No.: 13/727,893

(22) Filed: Dec. 27, 2012

(65) Prior Publication Data

US 2013/0187615 A1 Jul. 25, 2013

(30) Foreign Application Priority Data

Jan. 23, 2012 (JP) .................................. 2012-011449

(51) Int. Cl.
*H02J 7/00* (2006.01)

(52) U.S. Cl.
CPC ............. *H02J 7/0031* (2013.01); *H02J 7/0016* (2013.01); *H02J 7/0026* (2013.01)

(58) Field of Classification Search
CPC ..... H02J 7/0026; H02J 7/0021; H02J 7/0016; H02J 7/0031; H02J 2007/0037; H02J 2007/004; H02J 7/0013; H02J 7/0022; H02J 2007/0039; H02J 7/00; H02J 7/0014; H02J 7/0018; H02J 7/0019; H02J 7/0029; H02J 7/0047; H02J 7/0091; H02J 7/1423
See application file for complete search history.

(56) References Cited

U.S. PATENT DOCUMENTS

| | | | |
|---|---|---|---|
| 2005/0134230 A1 | 6/2005 | Sato et al. | |
| 2005/0242780 A1* | 11/2005 | Sakuma et al. | 320/134 |
| 2009/0198399 A1* | 8/2009 | Kubo et al. | 701/22 |
| 2010/0097033 A1* | 4/2010 | Tange | 320/116 |
| 2012/0025770 A1* | 2/2012 | Suzuki et al. | 320/118 |

FOREIGN PATENT DOCUMENTS

JP 2005-151696 6/2005

\* cited by examiner

*Primary Examiner* — Nha Nguyen
(74) *Attorney, Agent, or Firm* — IPUSA, PLLC (57) ABSTRACT

A disclosed battery protecting circuit includes a battery protecting IC powered by a voltage of a secondary battery; another battery protecting IC powered by a voltage of another secondary battery connected to the secondary battery in series; and a constant voltage output unit which receives a maximum voltage obtained by adding voltages of the secondary battery and the other secondary battery in series and outputs a constant voltage upon receipt of a control signal from an output terminal of the battery protecting IC or the other battery protecting IC.

8 Claims, 5 Drawing Sheets

BATTERY PROTECTING CIRCUIT, BATTERY PROTECTING DEVICE, AND BATTERY PACK

CROSS-REFERENCE TO RELATED APPLICATIONS

This patent application is based upon and claims the benefit of priority of Japanese Patent Application No. 2012-011449 filed on Jan. 23, 2012 the entire contents of which are incorporated herein by reference.

BACKGROUND OF THE INVENTION

1. Field of the Invention

The present invention generally relates to a battery protecting circuit which protects plural secondary batteries connected in series, and a battery protecting device. Further, the present invention relates to a battery pack having the battery protecting device.

2. Description of the Related Art

Figure 1:
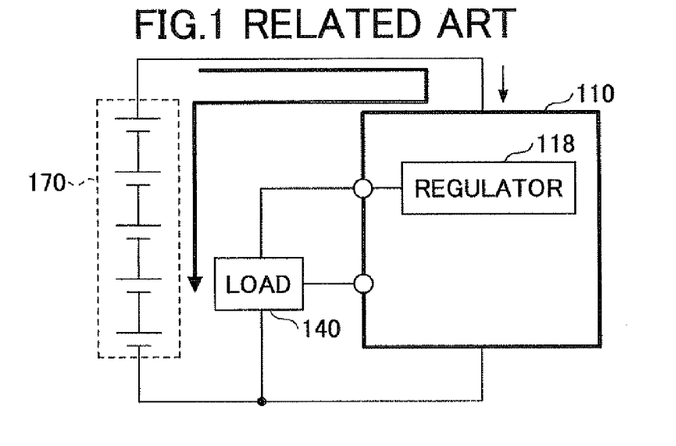
FIG. 1 illustrates an exemplary circuit of a battery protecting IC of a related art.

FIG. 1 illustrates a battery protecting IC 110 powered by the voltage of a secondary battery 170. The battery protecting IC 110 has a regulator 118 built-in. The regulator 118 supplies electric power to an external load 140 which is provided outside the battery protecting IC 110. Therefore, the electric power supplied by the secondary battery 170 is consumed by the battery protecting IC 110, the regulator 118, and the load 140.

For example, Patent Document 1 discloses a battery protecting IC into which the regulator is built.

[Patent Document 1] Japanese Laid-open Patent Publication No. 2005-151696

SUMMARY OF THE INVENTION

Accordingly, embodiments of the present invention may provide a novel and useful battery protecting circuit solving one or more of the problems discussed above.

More specifically, the embodiments of the present invention may provide a battery protecting circuit includes a battery protecting IC powered by a voltage of a secondary battery; another battery protecting IC powered by a voltage of another secondary battery connected to the secondary battery in series; and a constant voltage output unit which receives a maximum voltage obtained by adding voltages of the secondary battery and the other secondary battery in series and outputs a constant voltage upon receipt of a control signal from an output terminal of the battery protecting IC or the other battery protecting IC.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

As described previously, the plural secondary batteries connected in series. However, when the plural battery protecting ICs each having a built-in regulator are provided for the secondary batteries, respectively, the electrical capacities between the secondary batteries may be unbalanced.

Figure 2:
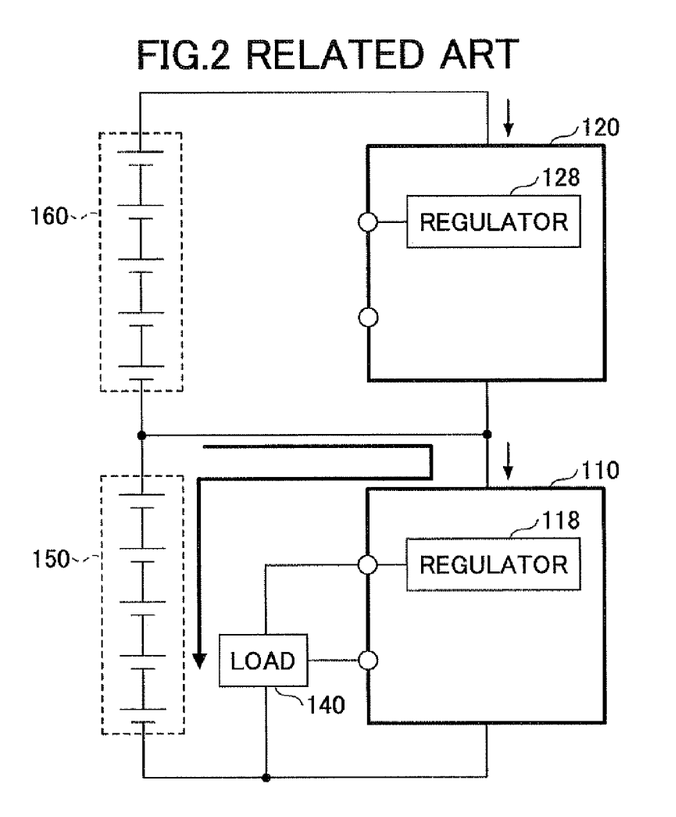
FIG. 2 illustrates an exemplary circuit of a battery protecting IC of the related art.

For example, referring to FIG. 2, a discharging current of the secondary battery 150 passes through the load 140. The discharging current of the secondary battery 160 does not pass through the load 140. Therefore, the voltage of the secondary battery 150 likely drops in comparison with the secondary battery 160. As a result, the capacities between the secondary batteries 150 and 160 tend to be unbalanced.

Figure 3:
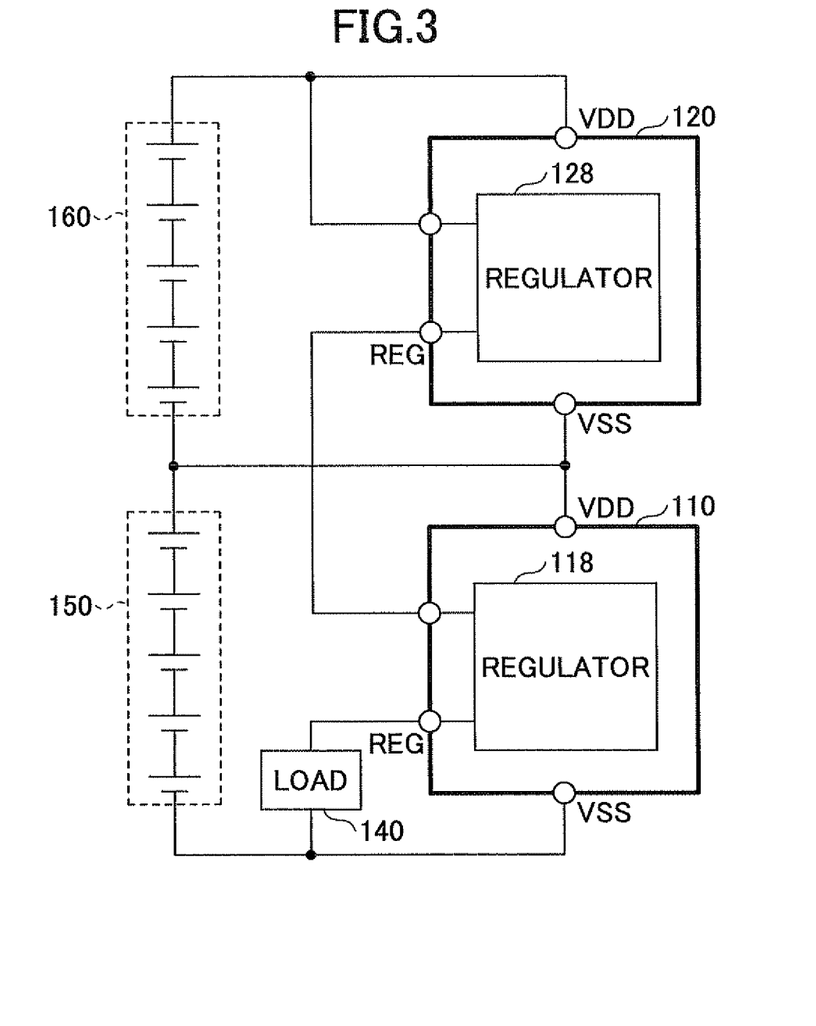
FIG. 3 illustrates an exemplary circuit of a battery protecting IC of the related art.

It is necessary to make the voltage between the input and output of the regulator built in the battery protecting IC equal a voltage between VDD-VSS or smaller. Therefore, referring to FIG. 3, the input voltage of the regulator 118 on the lower stage exceeds the VDD voltage. Then, there is a risk of a parasitic element such as a transistor inside the regulator being operated.

A description is given below, with reference to the FIG. 4 through FIG. 6 of embodiments of the present invention.

Reference symbols typically designate as follows:
1: charge controlling transistor;
2: discharge controlling transistor;
3,4,7: cell connecting terminal;
5,6: load connecting terminal;
10,20,110,120: battery protecting IC;
11-17,21-27: outer terminal;
30: secondary battery;
40,140: load;
50,60: assembled battery;
70,150,160,170: secondary battery;
80: protecting module;
90: outer load; and
100: battery pack.

Figure 4:
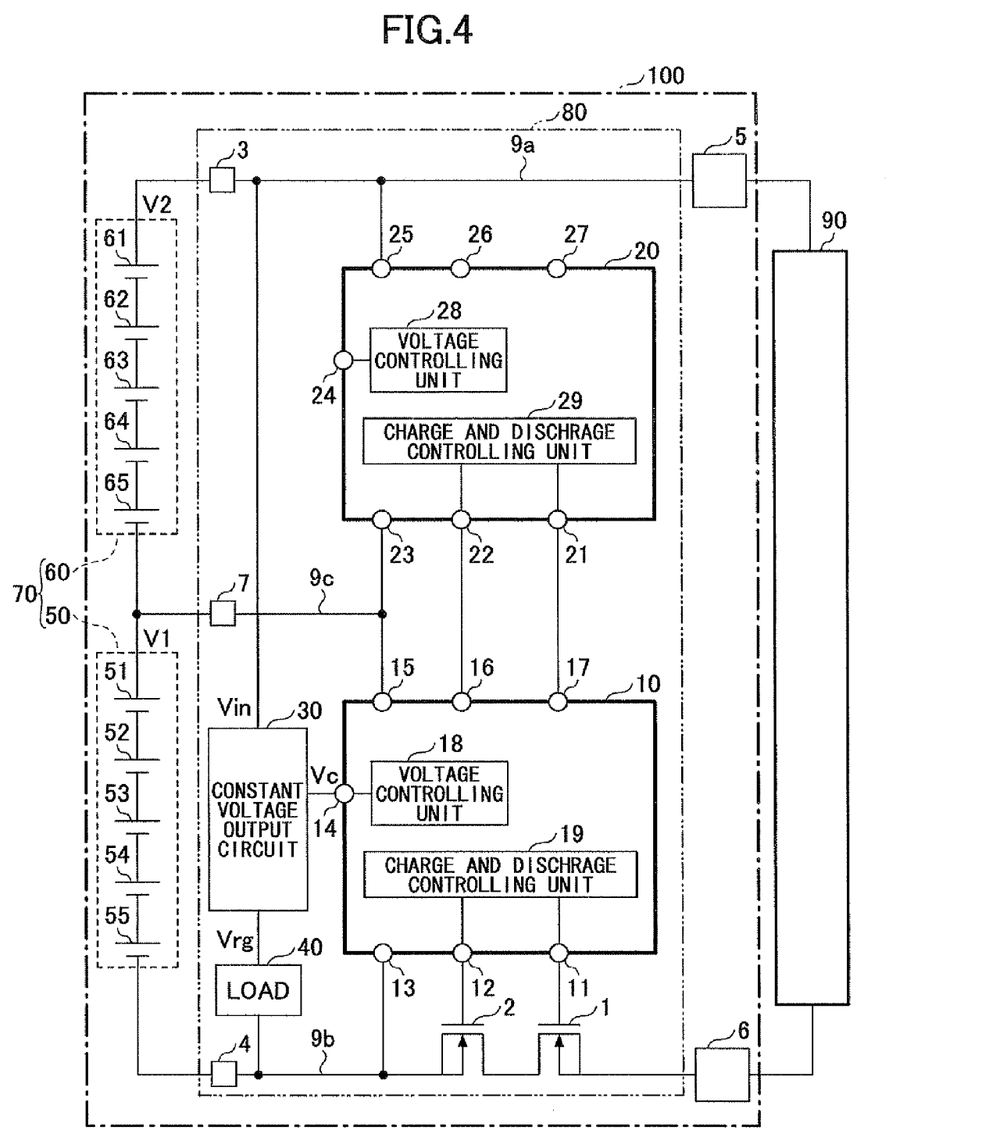
FIG. 4 illustrates an exemplary circuit of a battery pack of an embodiment.

FIG. 4 illustrates an exemplary circuit of a battery pack 100 of an embodiment. The battery pack 100 has a secondary battery 70 which can supply electric power to an outer load 90 connected to the load connecting terminals 5 and 6, and a protecting module 80 which protects the secondary battery 70. The secondary battery 70 and the protecting module 80 are built into the battery pack 100. The battery pack 100 may be built into the outer load 90 or attached to the outside of the outer load 90. For example, the outer load 90 is an electric power tool, an electric power assisted bicycle, or an electric motorcycle The secondary battery 70 can be charged by a charger (not illustrated) which is connected to load connecting terminals 5 and 6. An exemplary secondary battery 70 is a lithium-ion battery, a nickel-metal hydride battery, or the like. Referring to FIG. 4, the secondary battery 70 is formed by assembled batteries 50 and 60 connected in series, for example.

The assembled battery 50 is formed of plural cells 51 to 55 connected in series. The assembled battery 60 is formed by plural cells 61 to 65 connected in series. The positive terminal of the assembled battery 50 is connected to the positive terminal of the cell 51. The negative terminal of the assembled battery 50 is connected to the negative terminal of the cell 55. The positive terminal of the assembled battery 60 is connected to the positive terminal of the cell 61. The negative terminal of the assembled battery 60 is connected to the negative terminal of the cell 65.

The protecting module 80 functions as a battery protecting device including the load connecting terminal 5, the load connecting terminal 6, and cell connecting terminals 3, 4, and 7. The cell connecting terminal 3 is connected to the load connecting terminal 5 via an electric power line 9a. The cell connecting terminal 4 is connected to the load connecting terminal 6 via an electric power line 9b. The cell connecting terminal 7 is connected to a terminal 15 of a battery protecting IC 10 and a terminal 23 of a battery protecting IC 20 via an electric power line 9c. The cell connecting terminal 3 is connected to the positive terminal of the assembled battery 60. The cell connecting terminal 4 is connected to the negative terminal of the assembled battery 50. The cell connecting terminal 7 is connected to the negative terminal of the assembled battery 60 and the positive terminal of the assembled battery 50.

The protecting module 80 includes transistors 1 and 2. The transistor 1 is a charging route shutoff unit for shutting off charging routes of the assembled batteries 50 and 60. The transistor 2 is a discharging route shutoff unit for shutting off discharging routes of the assembled batteries 50 and 60. Referring to FIG. 4, the transistor 1 shuts off the electric power line 9b through which a charging current for the assembled batteries 50 and 60 flows, and the transistor 2 shuts off the electric power line 9b through which a discharging current for the assembled batteries 50 and 60 flows. The transistors 1 and 2 are switching elements for switching over conduction and shutoff of the electric power line 9b. The transistors 1 and 2 are arranged in series and inserted into the electric power line 9b.

For example, the transistors 1 and 2 are MOSFETs. The transistor 1 is inserted in the electric power line 9b so that the forward direction of a parasitic diode of the transistor 1 is arranged in the discharging direction of the assembled batteries 50 and 60 and the forward direction of the parasitic diode of the transistor 2 is arranged in the charging direction of the assembled batteries 50 and 60. The transistors 1 and 2 may be another type of semiconductor element such as an IGBT and a bipolar transistor. A diode may be added between the drain and the source (or the collector and the emitter) of each of the transistors 1 and 2.

The protecting module 80 includes the battery protecting ICs (hereinafter, "a protecting IC") 10 and 20 which are equal to the number of the assembled batteries 50 and 60. The protecting ICs 10 and 20 perform protecting operations of the assembled batteries 50 and 60. The protecting IC 10 is connected to the assembled battery 50 in parallel. The protecting IC 10 is an integrated circuit which is powered by a battery voltage V1 between the positive and negative terminals of the assembled battery 50. The protecting IC 20 is connected to the assembled battery 60 in parallel. The protecting IC 20 is an integrated circuit which works with a battery voltage V2 between the positive and negative terminals of the assembled battery 60. The protecting ICs 10 and 20 are formed of different chips. However, the circuit structures of the protecting ICs 10 and 20 are the same.

A charge and discharge controlling unit 19 of the protecting IC 10 monitors the battery voltage V1 of the assembled battery 50 by detecting the voltage between the terminal 15 of the protecting IC 10 (a VDD terminal) and the terminal 13 of the protecting IC 10 (a VSS terminal). Similarly, a charge and discharge controlling unit 29 of the protecting IC 20 monitors the battery voltage V2 of the assembled battery 60 by detecting the voltage between a terminal 25 of the protecting IC 20 (the VDD terminal) and the terminal 23 of the protecting IC 20 (the VSS terminal). The terminals 13 and 15 are power supply terminals for the protecting IC 10. The terminals 23 and 25 are power supply terminals for the protecting IC 20.

The terminal 15 is a positive power supply terminal connected to the electric power line 9c. The terminal 13 is a negative power supply terminal connected to the electric power line 9b. The terminal 25 is a positive power supply terminal connected to the electric power line 9a. The terminal 23 is a negative power supply terminal connected to the electric power line 9c.

The protecting module 80 outputs a high level signal for turning on the transistor 1 or a low level signal for turning off the transistor 1 from a terminal 11 of the protecting IC 10. The protecting IC 10 allows an electric current to flow through the electric power line 9b in the charging direction for charging the assembled batteries 50 and 60 by turning on the transistor 1. The protecting IC 10 prevents an electric current from flowing through the electric power line 9b in the charging direction for charging the assembled batteries 50 and 60 by turning off the transistor 1.

The protecting module 80 outputs a high level signal for turning on the transistor 2 or a low level signal for turning off the transistor 2 from a terminal 12 of the protecting IC 10. The protecting IC 10 allows an electric current to flow through the electric power line 9b in the discharging direction for discharging the assembled batteries 50 and 60 by turning on the transistor 2. The protecting IC 10 prevents an electric current from flowing through the electric power line 9b in the discharging direction for discharging the assembled batteries 50 and 60 by turning off the transistor 2.

In a manner similar to the above, the protecting module 80 outputs a high level signal for turning on the transistor 1 or a low level signal for turning off the transistor 1 from the terminal 21 of the protecting IC 20. Referring to FIG. 4, a signal output from the terminal 21 is input into the terminal 17 of the protecting IC 10. The protecting IC 20 turns on or off the transistor 1 via the protecting IC 10. The protecting IC 20 allows an electric current to flow through the electric power line 9b in the charging direction for charging the assembled batteries 50 and 60 by turning on the transistor 1. The protecting IC 20 forbids an electric current from flowing through the electric power line 9b in the charging direction for charging the assembled batteries 50 and 60 by turning off the transistor 1.

The protecting module 80 outputs a high level signal for turning on the transistor 2 or a low level signal for turning off the transistor 2 from a terminal 22 of the protecting IC 20. Referring to FIG. 4, a signal output from the terminal 22 is input into a terminal 16 of the protecting IC 10. The protecting IC 20 turns on or off the transistor 2 via the protecting IC 10. The protecting IC 20 allows an electric current to flow through the electric power line 9b in the discharging direction for discharging the assembled batteries 50 and 60 by turning on the transistor 2. The protecting IC 20 prevents an electric current from flowing through the electric power line 9b in the discharging direction for discharging the assembled batteries 50 and 60 by turning off the transistor 2.

An overcharge detecting circuit included in the charge and discharge controlling unit 19 detects whether the value of the battery voltage is a first predetermined overcharge detecting threshold or greater in the assembled battery 50. When it is detected that the value of the battery voltage is the first predetermined overcharge detecting threshold or greater in the assembled battery 50, the overcharge detecting circuit outputs an abnormal charge detecting signal as overcharge in the assembled battery 50 being detected. The charge and discharge controlling unit 19 outputs a low level signal for turning off the transistor 1 from the terminal 11 when the abnormal charge detecting signal for the assembled battery 50 is output.

Meanwhile, an overcharge detecting circuit included in the charge and discharge controlling unit 29 detects whether the value of the battery voltage is a second predetermined overcharge detecting threshold or greater in the assembled battery 60. When it is detected that the value of the battery voltage is the second predetermined overcharge detecting threshold or greater in the assembled battery 60, the overcharge detecting circuit outputs an abnormal charge detecting signal as overcharge in the assembled battery 50 being detected. The charge and discharge controlling unit 29 outputs a low level signal for turning off the transistor 1 when an abnormal charge detecting signal for the assembled battery 60 is output. The signal output by the terminal 21 is supplied to the charge and discharge controlling unit 19 via the terminal 17.

Therefore, the charge and discharge controlling unit 19 turns off the transistor 1 by outputting a low level signal from the terminal 11 of the protecting IC 10 when the abnormal charge detecting signal is output from at least one of the charge and discharge controlling unit 19 and the charge and discharge controlling unit 29. Thus, irrespective of turning on or off the transistor 2, it is possible to protect the assembled batteries 50 and 60 from overcharging. Further, even though one of the assembled batteries 50 and 60 shows abnormal charge, both of the assembled batteries 50 and 60 can be prevented from being charged. As a result, it is possible to prevent the assembled battery from which the abnormal charge is detected from being charged. Further, it is also possible to prevent the normal assembled battery from being charged.

An overdischarge detecting circuit included in the charge and discharge controlling unit 19 detects whether the value of the battery voltage is the first predetermined overcharge detecting threshold or less in the assembled battery 50. When it is detected that the value of the battery voltage is the first predetermined overcharge detecting threshold or less in the assembled battery 50, an overdischarge detecting circuit outputs an abnormal discharge detecting signal as overdischarge in the assembled battery 50 being detected. The charge and discharge controlling unit 19 outputs a low level signal for turning off the transistor 2 when the abnormal discharge detecting signal for the assembled battery 50 is output.

Meanwhile, an overdischarge detecting circuit included the charge and discharge controlling unit 29 detects whether the value of the battery voltage is the second predetermined overcharge detecting threshold or less in the assembled battery 60. When it is detected that the value of the battery voltage is the second predetermined overdischarge detecting threshold or less in the assembled battery 60, the overdischarge detecting circuit outputs an abnormal discharge detecting signal as overdischarge in the assembled battery 60 being detected. The charge and discharge controlling unit 29 outputs a low level signal for turning off the transistor 2 from the terminal 22 when the abnormal discharge detecting signal of the assembled battery 60 is output. The signal output by the terminal 22 is supplied to the charge and discharge controlling unit 19 via the terminal 16.

Therefore, the charge and discharge controlling unit 19 turns off the transistor 2 by outputting a low level signal from the terminal 12 of the protecting IC 10 when the abnormal discharge detecting signal is output from at least one of the charge and discharge controlling unit 19 and the charge and discharge controlling unit 29. Thus, irrespective of turning on or off the transistor 1, it is possible to protect the assembled batteries 50 and 60 from overdischarging. Even if only one of the assembled batteries 50 and 60 shows the abnormal discharge, it is possible to prevent both of the assembled batteries 50 and 60 from discharging. As a result, it is not only possible to prevent the assembled battery, from which the abnormal discharge is detected, from discharging but also possible to prevent the normal assembled battery from discharging.

The charge and discharge controlling units 19 and 29 may have a charging overcurrent detecting circuit. The charging overcurrent detecting circuit detects a negative interterminal voltage of a predetermined charging overcurrent detecting threshold or less. Then, the charging overcurrent detecting circuit outputs the abnormal charge detecting signal as an overcurrent (a charging overcurrent) in the charging direction for charging the assembled batteries 50 and 60 being detected by detecting the negative interterminal voltage of the predetermined charging overcurrent detecting threshold or less. The negative interterminal voltage designates the voltage between the load connecting terminal 6 and the cell connecting terminal 4. Therefore, the charge and discharge controlling unit 19 turns off the transistor 1 by outputting a low level signal from the terminal 11 of the protecting IC 10 when the abnormal charge detecting signal is output from at least one of the charging overcurrent detecting circuits of the charge and discharge controlling unit 19 and the charge and discharge controlling unit 29. Thus, irrespective of turning on or off the transistor 2, it is possible to protect the assembled batteries 50 and 60 from the charging overcurrent.

The charge and discharge controlling units 19 and 29 may have a discharging overcurrent detecting circuit. The discharging overcurrent detecting circuit detects whether the value of a negative interterminal voltage is a predetermined discharging overcurrent detecting threshold or greater. When the value of the negative interterminal voltage is the predetermined discharging overcurrent detecting threshold or greater, the discharging overcurrent detecting circuit outputs an abnormal discharge detecting signal as an overcurrent (a discharging overcurrent) in the discharging direction for discharging the assembled batteries 50 and 60 being detected by detecting the negative interterminal voltage of the predetermined discharging overcurrent detecting threshold or greater. Therefore, the charge and discharge controlling unit 19 turns off the transistor 2 by outputting a low level signal from the terminal 12 of the protecting IC 10 when the abnormal discharge detecting signal is output from at least one of the discharging overcurrent detecting circuits of the charge and discharge controlling unit 19 and the charge and discharge controlling unit 29. Thus, irrespective of turning on or off the transistor 1, it is possible to protect the assembled batteries 50 and 60 from the discharging overcurrent.

Further, the protecting IC 10 includes a voltage controlling unit 18. The voltage controlling unit 18 outputs a control signal Vc for controlling an operation of a constant voltage output circuit 30 via a terminal 14 of the protecting IC 10. The terminal 14 is an external output terminal for supplying the control signal Vc from the protecting IC 10 to the constant voltage output circuit 30 provided outside the protecting IC 10. Further, the protecting IC 20 includes a voltage controlling unit 28 in a manner similar to the protecting IC 10. However, the voltage controlling unit 28 is not connected to the constant voltage output circuit 30 via a terminal 24 of the protecting IC 20.

The protecting module 80 includes the constant voltage output circuit 30 as a constant voltage outputting unit for outputting a constant voltage Vrg upon receipt of the control signal Vc which is supplied from the terminal 14 of the protecting IC 10. The constant voltage output circuit 30 receives a maximum voltage Vin of the secondary battery 70 (i.e., the sum of the battery voltage V1 and the battery voltage V2). Said differently, the constant voltage output circuit 30 receives the electric power from the positive terminal of the assembled battery 60 having the highest voltage between the assembled batteries 50 and 60 forming the secondary battery 70. The constant voltage output circuit 30 generates the constant voltage Vrg lower than the maximum voltage Vin by converting to drop the maximum voltage Vin input via the electric power line 9*a* connected to the positive terminal of the assembled battery 60.

The constant voltage Vrg output from the constant voltage output circuit 30 is supplied to a load 40 installed in the protecting module 80. The load 40 is connected to the electric power line 9*b* which is connected to the negative terminal of the assembled battery 50 having the lowest voltage between the assembled batteries 50 and 60 forming the secondary battery 70.

Referring to FIG. 4, the protecting IC 10 is operated by the battery voltage V1 of the assembled battery 50, the protecting IC 20 is powered by the battery voltage V2 of the assembled battery 60, and the constant voltage output circuit 30 is powered by the battery voltage Vin of the entire secondary battery 70 which is the sum of the battery voltage V1 of the assembled battery 50 and the battery voltage V2 of the assembled battery 60. Said differently, the constant voltage output circuit 30 is not powered by the battery voltage of a part of the assembled batteries 50 and 60 forming the secondary battery 70. Thus, it is possible to prevent the capacity of the part of the assembled batteries from being disproportionately reduced. Therefore, the capacities of the assembled batteries 50 and 60 are scarcely unbalanced. Since the capacities are scarcely unbalanced, the total capacity usable as the battery pack 100 is reduced. Therefore, it is possible to prevent the charge and discharge efficiency from degrading.

Figure 5:
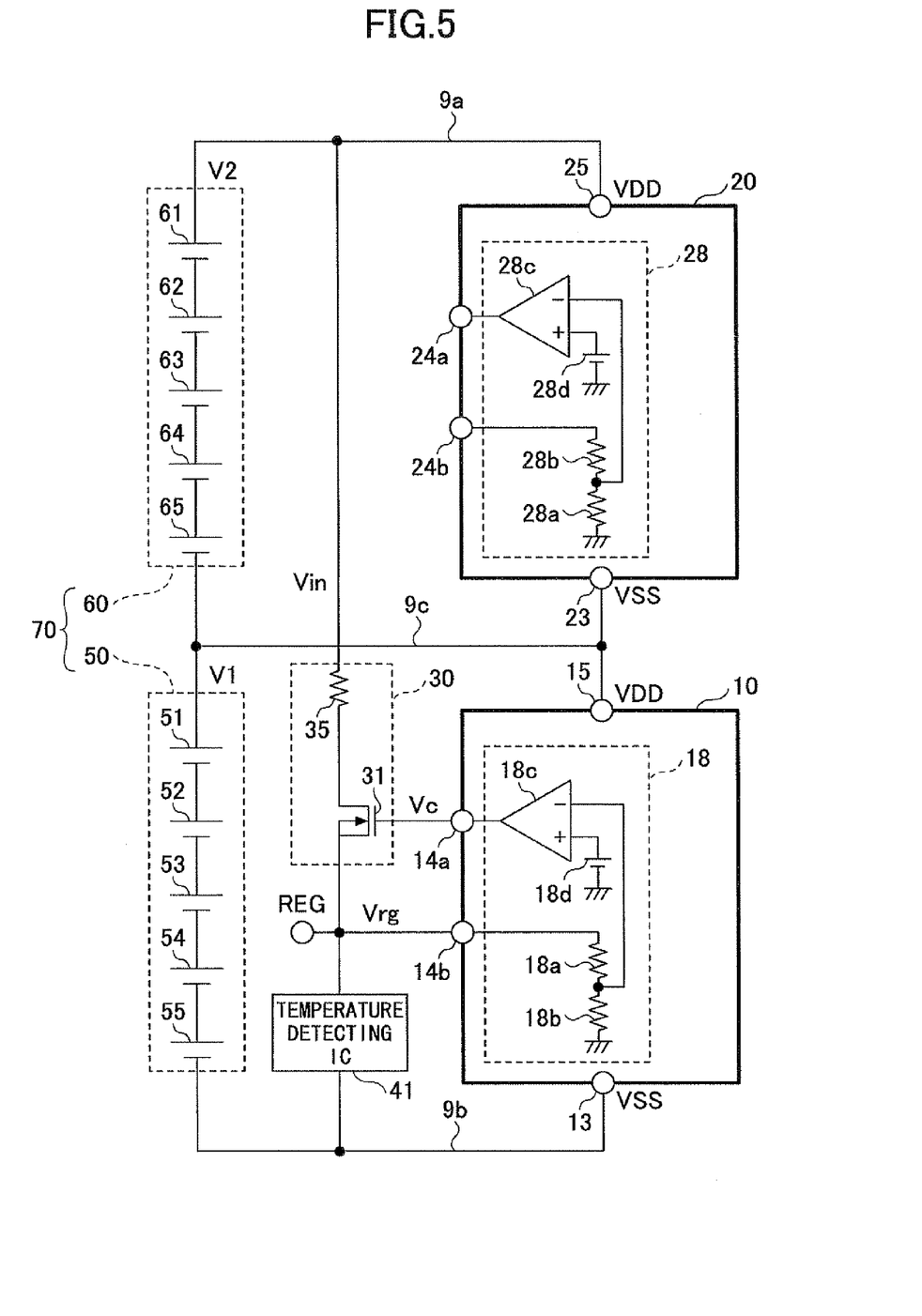
FIG. 5 illustrates a first example of the structure of the battery pack.

FIG. 5 specifically illustrates a first example of the structure of the battery pack 100 illustrated in FIG. 4.

A temperature detecting IC 41 is a load powered by the constant voltage Vrg supplied from the constant voltage output circuit 30. The temperature detecting IC 41 may be an integrated circuit. The temperature detecting IC 41 detects the temperature of the secondary battery 70 inside the battery pack 100.

The protecting ICs 10 and 20 are operated to protect the assembled batteries 50 and 60 forming the secondary battery 70 using the temperature detected by the temperature detecting IC 41. For example, the charge and discharge controlling units of the protecting ICs 10 and 20 output the abnormal charge detecting signal or the abnormal discharge detecting signal when the value of the temperature detected by the temperature detecting IC 41 is a predetermined temperature threshold or greater. When the abnormal charge detecting signal is output so as to turn off the transistor 1, the assembled batteries 50 and 60 can be prevented from being charged. Thus, it is possible to prevent the assembled batteries 50 and 60 from being charged under a high temperature. When the abnormal discharge detecting signal is output so as to turn off the transistor 2, the assembled batteries 50 and 60 can be prevented from being discharged under the high temperature.

The constant voltage output circuit 30, as a constant voltage generating unit for generating the constant voltage Vrg based on the control signal Vc supplied from the output terminal 14*a* of the protecting IC 10, includes a series regulator formed by a series circuit including a resistor 35 and a transistor 31. The control signal Vc is input into a control electrode (e.g., the gate or the base) of the transistor 31. One end of the resistor 35 is connected to the electric power line 9*a*. The other end of the resistor 35 is connected to a first main terminal (e.g., the drain or the collector) of the transistor 31. A second main terminal (e.g., the source or the emitter) of the transistor 31 is a terminal from which the constant voltage Vrg is output. The second main terminal of the transistor 31 is connected to a power supply terminal of the temperature detecting IC 41 and an input terminal 14*b* of the protecting IC 10. The transistor 31 is specifically a semiconductor element such as a MOSFET or a bipolar transistor.

The protecting IC 10 includes the voltage controlling unit 18, which generates the control signal Vc for controlling the transistor 31 of the constant voltage output circuit 30, so that the constant voltage Vrg which is fed back via the input terminal 14*b* becomes a predetermined constant voltage.

The voltage controlling unit 18 includes resistors 18*a* and 18*b*, an amplifier 18*c*, and a reference voltage source 18*d*. The amplifier 18*c* amplifies an error between a detection voltage corresponding to the constant voltage Vrg which is detected by the resistors 18*a* and 18*b* and a reference voltage of the reference voltage source 18*d*, and outputs the amplified voltage as the control signal Vc.

The constant voltage output circuit 30 stops outputting the constant voltage Vrg when the voltage controlling unit 18 detects that the constant voltage Vrg exceeds a predetermined value to thereby supply the control signal Vc to the constant voltage output circuit 30. For example, it is possible to prevent the temperature detecting IC 41 from short-circuiting. Thus, an overcurrent can be prevented from flowing.

Figure 6:
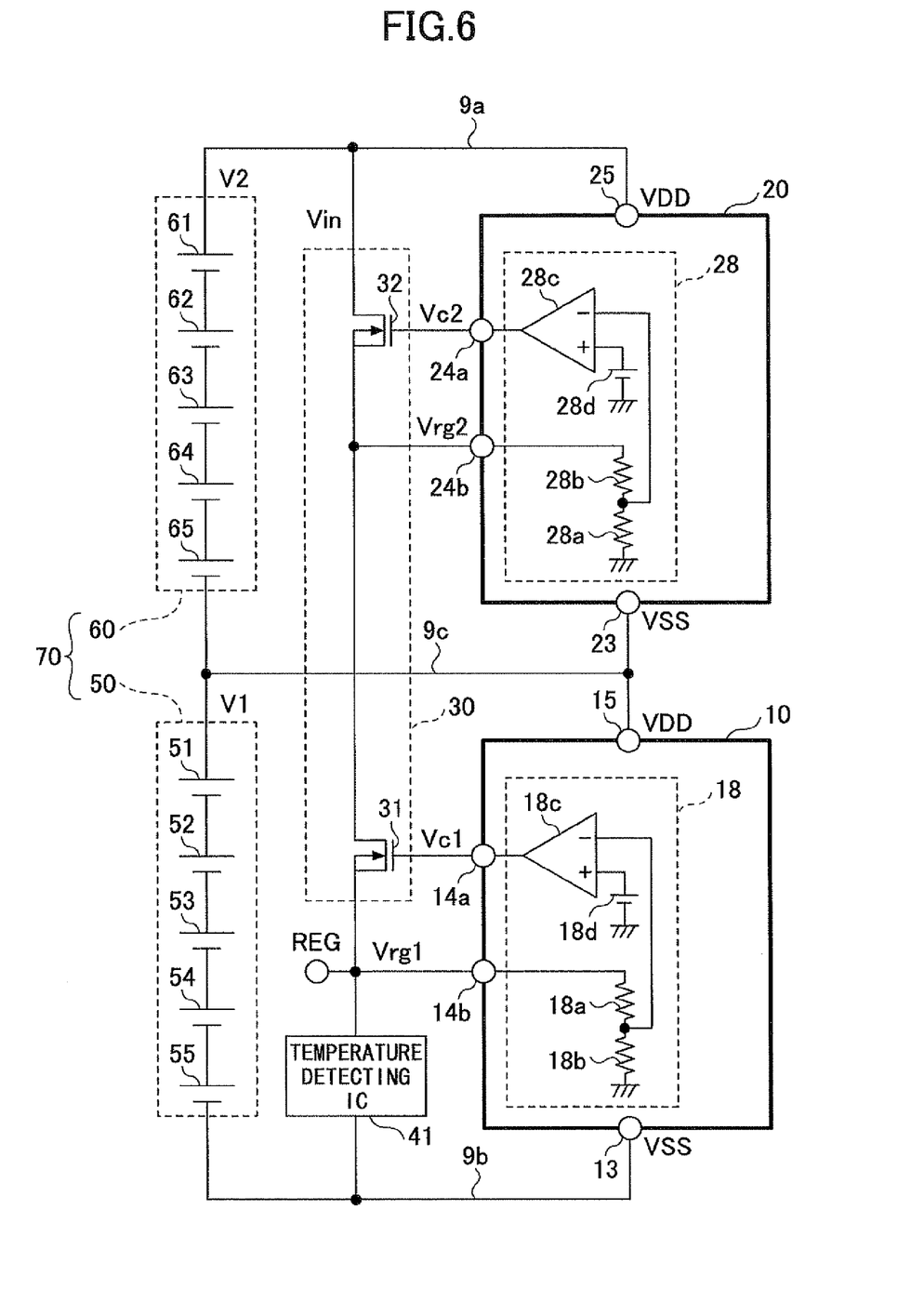
FIG. 6 illustrates a second example of the structure of the battery pack.

FIG. 6 specifically illustrates a second example of the structure of the battery pack 100 illustrated in FIG. 4. The explanation of the structure similar to that of FIG. 5 is omitted.

Referring to FIG. 6, the constant voltage generating circuit 30 includes constant voltage generating units corresponding to the control signals. The constant voltage generating units generate the constant voltages upon receipt of the corresponding control signals supplied from the output terminals of the protecting ICs 10 and 20. Said differently, the constant voltage output circuit 30 illustrated in FIG. 6 includes the transistor 31 as the constant voltage generating unit for generating a constant voltage Vrg1 in conformity with a control signal Vc1 which is supplied from the output terminal 14*a* of the protecting IC 10, and a transistor 32 as the constant voltage generating unit for generating a constant voltage Vrg2 in conformity with a control signal Vc2 which is supplied from the output terminal 24*a* of the protecting IC 20.

The control signal Vc1 is input into the control electrode (e.g., the gate or the base) of the transistor 31. The control signal Vc2 is input into a control electrode (e.g., the gate or the base) of the transistor 32. A first main terminal of the transistor 32 is connected to the electric power line 9*a*. A second main terminal of the transistor 32 is a terminal to which the constant voltage Vrg2 is output. The second main terminal of the transistor 32 is connected to the first main terminal of the transistor 31 and an input terminal 24*b* of the protecting IC 20. The second main terminal of the transistor 31 is a terminal to which the constant voltage Vrg1 is output. The second main terminal of the transistor 31 is connected to the power supply terminal of the temperature detecting IC 41 and the input terminal 14*b* of the protecting IC 10. The transistors 31 and 32 are specifically semiconductor elements such as a MOSFET or a bipolar transistor.

The protecting IC 10 includes the voltage controlling unit 18, which generates the control signal Vc1 for controlling the transistor 31 of the constant voltage output circuit 30, so that the constant voltage Vrg1 which is fed back via the input terminal 14b becomes a predetermined constant voltage. The protecting IC 20 includes a voltage controlling unit 28, which generates the control signal Vc2 for controlling the transistor 32 of the constant voltage output circuit 30, so that the constant voltage Vrg2 which is fed back via an input terminal 24b becomes a predetermined constant voltage. The structures of the voltage controlling units 18 and 28 are similar to the structures of the voltage controlling units 18 and 28 illustrated in FIG. 5.

Referring to FIG. 6, a voltage difference obtained by subtracting the constant voltage Vrg1 from the maximum voltage Vin is divided by the transistors 31 and 32. Therefore, the transistors 31 and 32 may have a low withstanding voltage. Further, if the transistor 31 is short-circuited and broken, the protecting IC 20 causes the transistor 32 to be turned off depending on the control signal Vc2 thereby preventing an overcurrent from flowing. Therefore, even if the transistor 32 is short-circuited and broken, the protecting IC 10 can cause the transistor 31 to be turned off depending on the control signal Vc1 thereby preventing an overcurrent from flowing. Thus, safety against the short-circuit and breakdown in the transistors 31 and 32 can be improved.

For example, in the above embodiment, the number of the assembled batteries, which form the secondary battery 70 and are arranged in series, is two. However, even if the number of the assembled batteries is three or more, the embodiment is similarly applicable. Further, the positions of the transistors 1 and 2 can be mutually replaced in FIG. 4.

Within the above embodiment, the charge controlling transistor 1 and the discharge controlling transistor 2 are inserted into the electric power line 9b on the negative terminal side. However, the charge controlling transistor 1 and the discharge controlling transistor 2 may be inserted into the electric power line 9a on the positive terminal side.

Further, the constant voltage output circuit 30 described above is a voltage down converter for outputting a constant voltage. However, the embodiment may be applicable to a voltage up converter (a booster).

Further, the above load 40 is not limited to a temperature detecting IC. The above load may be another load. For example, the load 40 may be an IC (a residual capacity IC) for monitoring the residual capacity of the secondary battery 70 or an IC (an authentication IC) for identifying the battery packs.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the battery protecting circuit has been described in detail, it should be understood that various changes, substitutions, and alterations could be made hereto without departing from the spirit and scope of the invention.

What is claimed is:

1. A battery protecting circuit comprising:
   a first battery protecting IC powered by a voltage of a first secondary battery;
   a second battery protecting IC powered by a voltage of a second secondary battery connected to the first secondary battery in series; and
   a constant voltage output unit which receives a maximum voltage obtained by adding voltages of the first secondary battery and the second secondary battery in series and outputs a constant voltage upon receipt of a control signal from an output terminal of the first battery protecting IC or the second battery protecting IC, said constant voltage output unit including a transistor which receives the maximum voltage and generates the constant voltage in conformity with the control signal.

2. The battery protecting circuit according to claim 1, wherein the constant voltage output unit includes the transistor provided for each of the control signals.

3. The battery protecting circuit according to claim 1, wherein the constant voltage output unit stops outputting the constant voltage when the constant voltage exceeds the predetermined value.

4. The battery protecting circuit according to claim 1, further comprising:
   a load powered by the constant voltage.

5. The battery protecting circuit according to claim 4, wherein the load includes a temperature detecting unit.

6. The battery protecting circuit according to claim 5, wherein the first battery protecting IC and the second battery protecting IC protect the first secondary battery and the second secondary battery using a temperature detected by the temperature detecting unit.

7. A battery protecting device comprising:
   a battery protecting circuit according to claim 1; and
   a shutoff unit for shutting off a current flowing through the first secondary battery and the second secondary battery in conformity with control outputs from the battery protecting circuit.

8. A battery pack comprising:
   the battery protecting device according to claim 7; and
   the first secondary battery; and
   the second secondary battery.

* * * * *